Figure 1:
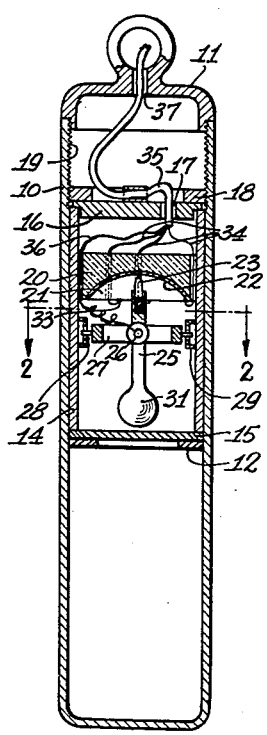

March 5, 1963  J. LUNDE  3,079,697
INCLINATION MEASURING INSTRUMENT
Filed Feb. 13, 1961

INVENTOR
John Lunde
BY Alex. E. MacRae
ATTORNEY

United States Patent Office 3,079,697
Patented Mar. 5, 1963

3,079,697
INCLINATION MEASURING INSTRUMENT
John Lunde, 1227 Greyrock Crescent, Ottawa,
Ontario, Canada
Filed Feb. 13, 1961, Ser. No. 89,044
2 Claims. (Cl. 33—206)

This invention relates to inclination measuring instruments and is a continuation-in-part of application Serial No. 730,551 filed April 24, 1958, now abandoned.

In many fields it is desirable to be able to determine, at a point remote from a particular element, the inclination or the angle from the vertical of the particular element. For one example, in the drilling of wells it is desirable to have a record of the inclination of the bore hole throughout the depth of the bore hole. For another example, it is sometimes desirable to be able to determine the inclination of some structural element where the particular element is not readily accessible.

In the past inclination measuring instruments or inclinometers have been proposed for providing a remote indication of inclination. These prior inclinometers are usually of costly and complicated manufacture.

One such prior art apparatus for giving an indication of inclination of a bore hole provides a casing with a double walled spherical container inside. Four spaced resistive elements are within the container's double walls and extend from a common bottom point in four different directions to four terminals near the top. Mercury in the bottom portion of the container unbalances remote external circuitry as it moves within the container in response to changing inclination and provides an indication of degree of inclination. If the casing includes a reference device such as a gyroscope, information as to direction of inclination is also provided.

This prior art apparatus provides a satisfactory measurement of inclination, however, the actual inclination measuring device comprising the double walled spherical container and the operating elements within are costly to manufacture. The mercury contact element must, of course, be in a sealed container or the instrument could not be inverted or moved rapidly without less of some of the liquid.

It is therefore an object of this invention to provide a simple, inexpensive and effective instrument for measuring inclination, not only of bore holes and the like, but also of structural members such as pillars, columns, building supports, and the like.

It is another object of this invention to provide an inexpensive inclination measuring device for an inclinometer where the device is relatively easy to manufacture.

The invention contemplates the provision of an inclination measuring instrument comprising a casing, a part spherical resistive element mounted in said casing, a solid electrode, universaly mounted, contacting a minor portion of the concave surface of said resistive element, said electrode being gravitationally movable over the surface of the resistance element in response to tilting of the casing, and variable resistance means responsive to the position of the electrode on the surface for indicating the inclination of the casing.

Figure 3:
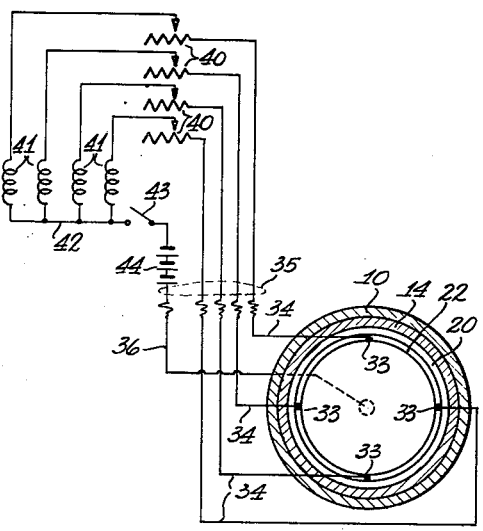
Figure 2:
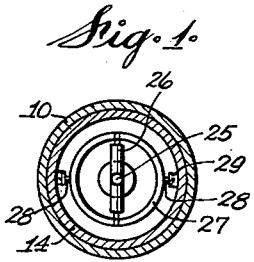
Figures 4, 5:
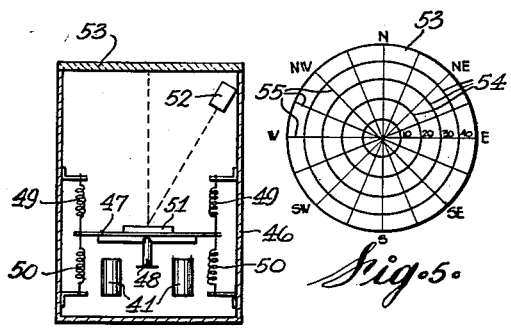
Figure 6:
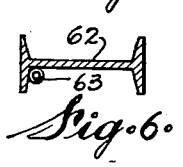
Figure 7:
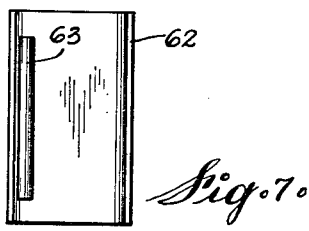

For a more detailed disclosure of the invention and for illustration of various embodiments thereof, reference is made to the accompanying drawings in which:

FIGURE 1 is a sectional side elevation of an inclination measuring instrument in accordance with one embodiment of the invention, FIGURE 2 is a cross-sectional view taken along line 2—2 of FIGURE 1, FIGURE 3 is a wiring diagram of the electrical circuit of the instrument shown in FIGURES 1 and 2, FIGURE 4 is a diagrammatic view of an indicating device for use with the instrument, FIGURE 5 is a plan view of a suitable screen for the device of FIGURE 4, FIGURE 6 is a cross sectional view of a structural element to which the instrument of the invention may be applied, and FIGURE 7 is a partial side elevation of the structural element of FIGURE 6.

Referring to FIGURES 1 and 2, a casing 10, of tubular form having a closed bottom end, is provided with a top closure 11. Closure 11 may be provided with an eye 19 for handling of the instrument. The casing 10 is formed of metal or other suitable material.

An annular shoulder 12 within casing 10 supports a tube 14 of insulating material. The tube 14 fits snugly within casing 10 and may be slid along the inside of casing 10 and removed when necessary. A bottom closure 15 may be provided for the tube 14. A cover 16 closes the top end of tube 14 and has an opening 17 through which a cable can pass as will be subsequently described. A ring or disc 18 is threaded on its periphery to engage the inner threaded portion 19 of casing 10. The ring 18 holds the cover 16 in place on tube 14 and also secures tube 14 in place within casing 10.

The tube 14 contains the actual inclination measuring device or mechanism. A block 20 of insulating material may be mounted within tube 14 to provide a support or backing for a resistive element 22. The resistive element 22 has on one side a part spherical recess 21. The block 20 also conveniently has a similar part spherical recess to receive and support resistive element 22. It will be apparent that if the part spherical resistance element 22 is sufficiently rigid, the support from block 20 will not be necessary and the resistive element can be mounted directly to the walls of tube 14.

One suitable arrangement or form for resistive element 22 is that of a sheath. In this example, the block 20 has a part spherical recess as before and the recess is provided with an electrically resistive sheath 22.

The surface of the resistive element 22 forming the part spherical recess 21 is adapted to be traversed by a contact 23 having a resilient mounting 24 in one end of a pin 25 which is carried by bar 26. The contact 23 contacts a minor portion of the surface of the resistive element and is referred to as a point electrode or a point contact to distinguish it from an electrode having a broad area contact surface. The electrode contact 23, is of course, not a sharp point contact, but is of limited area such as might be achieved, for example, by a rolling ball mounted resiliently in the end of pin 25, or by a cylindrical contact member resiliently mounted in the end of pin 25 where the contact end of the cylinder is smoothly rounded.

Bar 26 is rotatably mounted in a ring 27 which in turn is revolvably mounted by means of spindles 28 in brackets 29 carried by the wall of tube 14. It will be apparent that pin 25 and its contact 23 has a universal swinging movement whereby contact 23 may traverse all points on the surface of resistive element 22. The solid point contact electrode in conjunction with the described universal mounting provide a satisfactory positive contact with the resistive element 22. The end of pin 25 remote from contact 23 is provided with a weight 31 which normally maintains pin 25 in a vertical position. Thus, when tube 14 is vertically disposed, the contact 23 is in engagement with the central point on the surface of resistive element 22.

The periphery or edge of the resistive element 22 is shown in FIGURE 3 as a ring. This is substantially what would appear in a view showing the resistive element 22 from below. Contacts 33 are made to the edge or ring of resistive element 22 as is best seen in FIGURES 1 and 3. Regardless of whether the resistive element 22 is a distinct element or in the form of a thin sheath, contacts can be readily made to it as is well known in the art. These contacts 33 are made at spaced points around the edge of the resistive element 22 and conductors 34 affixed thereto. The conductors 34 pass upwards past the edge of resistive element 22, and if a block 20 is used the conductors 34 may pass between block 20 and the walls of tube 14 through small openings. A conductor 36 is connected to contact 23 in pin 25 and also passes upwards past resistive element 22. The conductors 34 and conductor 36 form part of a cable 35 which extends through the previously mentioned opening 17 in cover 16, through ring or disc 18, and through an opening 37 in top closure 11. The cable 35 conducts the wires from the device in tube 14 to external remote circuitry.

The circuitry associated with the inclination measuring device and with the external circuitry is shown schematically in FIGURE 3. The cable 35 contains conductors 34 and conductor 36. Conductors 34 are connected through variable resistances 40 and magnetic coils 41 to a common point 42. The common point 42 is connected through switch 43 to one side of a power source shown as battery 44. The other side of the power source is connected to conductor 36 to complete the circuit.

In the operation of the embodiment shown in FIGURES 1, 2 and 3, it will be apparent that tube 14 may be rotatably mounted in casing 10 and may be maintained in a particular orientation by a gyroscope regardless of movement of casing 10, in order to obtain information as to the direction of the angle of inclination being measured.

In the operation of the instrument, the resistances 40 are adjusted while the instrument is in an upright position to obtain balanced current through magnetic coils 41. The magnetic coils 41 are the coils which give the remote indication of inclination. As the inclination of the instrument alters from the vertical, the contact 23 moves to a position which is no longer at the center of coating 22, that is the contact 23 is no longer equi-distant from contacts 33. The current through the magnetic coils 41 alters accordingly, and the alteration of current or unbalance of current is used to give an indication of inclination. It will be apparent that for ease of calibration, it is preferable to have resistive element 22 with a substantially uniform resistance. It will be apparent that if tube 14 is always oriented in a particular direction, then the contacts 33 will have a known azimuth orientation and the indicating device operated by coils 41 can be calibrated for direction of inclination as well as angle of inclination.

FIGURES 4 and 5 illustrate diagrammatically an indicating means suitable for indicating direction of inclination and degree of inclination when used with an embodiment including an azimuth oriented tube 14 as previously mentioned. FIGURE 4 is a sectional view showing two of the four magnetic coils 41 mounted in a casing 46. The magnetic coils 41 are mounted below an armature 47 that is tiltably supported on a central post 48. The armature 47 is biased to a predetermined position by springs 49 and 50 which extend from brackets on casing 46 to the armature 47. A mirror or like reflecting member 51 is mounted on the armature 47 and adapted to receive light beams from a source 52 and reflect the light onto a screen 53. The reflecting surface 51 will reflect light from source 52 onto a portion of screen 53 determined by the angle of tilt of armature 47 and the direction of the tilt. The tilt of the armature is in turn determined by the amount of current flowing in the different coils 41. Consequently, at any time, the reflected beam of light will assume a position on screen 53 that is dependent upon the inclination of the instrument. As shown in FIGURE 5 the screen 53 has markings 54 to indicate amount or degree of inclination and markings 55 to indicate the direction of the inclination.

A practical application of the instrument according to the invention is illustrated in FIGURES 6 and 7. A pillar or column 62 which is adapted to assume a vertical position in a building support structure, has a pipe 63 welded thereto in longitudinal parallel relation therewith. The instrument described is lowered into the pipe 63 and any inclination of the pillar 62 will be indicated. This application is, of course, additional to the various applications of the instrument in measuring the inclination of bore holes in drilling.

Other embodiments and modifications of this invention will be apparent to those skilled in the art, and it is the intention to include such embodiments and modifications as fall within the true scope of the invention in the appended claims.

I claim:

1. An inclination measuring instrument comprising a casing, an insulating member having a part spherical recess in the bottom surface thereof mounted in said casing, a resistive element having a part spherical shape in the part spherical recess of said insulating member, a ring mounted at two diametrically opposed points for pivotal movement within said casing about a first axis defined by said points, a bar mounted at the ends thereof for rotary movement about a second axis defined by the mountings at the ends of said bar, said first and second axes intersecting at right angles, a pin mounted in said bar substantially at the intersection of said first and second axes, a limited area contact element resiliently mounted in one end of said pin, said contact element being in substantially constant contact with said surface of said resistive element, a weight affixed to the other end of said pin to maintain said pin and said contact element in substantially vertical position, said contact element being adapted for movement over said surface of said resistive element in response to tilting movement of said casing, at least four conductors in electrical contact with the edge of said resistive element and in equally spaced relation about said edge, an electrical network including a variable resistance means and a magnetic coil associated with each said conductor, a power source connected in said network to cause an electrical current to flow in said network, the distribution of current in said network and through said magnetic coils varying in response to the distance of said contact element from the points at which said conductors make electrical contact with the edge of said resistive element, and an indicator, the current through said magnetic coils controlling said indicator to provide an indication of inclination.

2. An inclination measuring instrument comprising a cylindrical casing, a block of insulating material mounted within said casing, said block having a part spherical recess in the bottom surface thereof, said recess having an electrically resistive sheath completely lining said recess and having an edge disposed at the mouth of said recess, a ring mounted within said casing at two diametrically opposed points for pivotal movement within said casing about a first axis defined by said points, a bar mounted at the ends thereof for rotary movement about a second axis defined by the mountings at the ends of said bar, said first and second axes intersecting at right angles, a pin mounted in said bar substantially at the intersection of said first and second axes, a limited area contact element resiliently mounted in one end of said pin, said contact element being in substantially constant contact with the part spherical surface of said resistive sheath a weight affixed to the other end of said pin to maintain said pin and said contact element in substantially vertical position, said contact element being adapted for movement over said surface of said resistive sheath in response to tilting movement of said casing, at least four conductors contacting the edge of said resistive sheath at equally spaced points around the said edge, an electrical network including the series connection of each of said conductors, a magnetic coil, a common power source and a common conductor connected to said contact element carried in said pin, the distribution of electrical current in said network and through said magnetic coils varying in response to the distance of said contact element from the points at which said conductors make electrical contact with the edge of said resistive sheath, and an indicator, the current through said magnetic coils controlling said indicator to provide an indication of inclination and direction.

References Cited in the file of this patent

UNITED STATES PATENTS

| | | |
|---|---|---|
| 2,198,523 | Adams | Apr. 23, 1940 |
| 2,232,360 | Barnett | Feb. 18, 1941 |
| 2,537,671 | Jack et al. | Jan. 9, 1951 |